United States Patent [19]

Hawkins

[11] 4,448,021
[45] May 15, 1984

[54] ANTI-STALL CONTROL

[75] Inventor: Royal R. Hawkins, Bloomington, Minn.

[73] Assignee: Sundstrand Corporation, Rockford, Ill.

[21] Appl. No.: 341,238

[22] Filed: Jan. 21, 1982

[51] Int. Cl.³ ............................................. F16H 39/46
[52] U.S. Cl. .................................. 60/449; 290/40 C; 290/51
[58] Field of Search ................. 60/445, 390, 391, 449, 60/395, DIG. 2; 417/222; 290/51, 40 C

[56] References Cited

U.S. PATENT DOCUMENTS 3,901,031  8/1975  Knapp et al.
3,914,938  10/1975 Cornell et al.
3,924,410  12/1975 Cornell et al.
4,158,290  6/1979  Cornell
4,180,979  1/1980  Cornell

OTHER PUBLICATIONS

Honeywell, "Instructions Forward Speed Control W883A".

Fulkerson, "Slow Recovery Circuit on Engine Load Control System", 12/17/79.

Primary Examiner—Robert E. Garrett
Assistant Examiner—John M. Husar
Attorney, Agent, or Firm—Wood, Dalton, Phillips, Mason & Rowe

[57] ABSTRACT

An anti-stall control for use in a system having an engine which drives a pump to supply fluid under pressure to a motor and including means responsive to a control voltage for altering the flow of fluid to the motor. The anti-stall control senses the speed of the engine and generates a voltage proportional thereto, the speed voltage being compared to a reference voltage for providing a D.C. signal proportional to the speed voltage. A quick dump/slow recovery circuit is responsive to a decrease in the amplitude of the D.C. signal for generating a control voltage which decreases at a fast rate to prevent overloading of the engine, the circuit being responsive to an increase in the D.C. signal for generating a control voltage which increases at a slow rate to improve the stability of the system.

11 Claims, 5 Drawing Figures

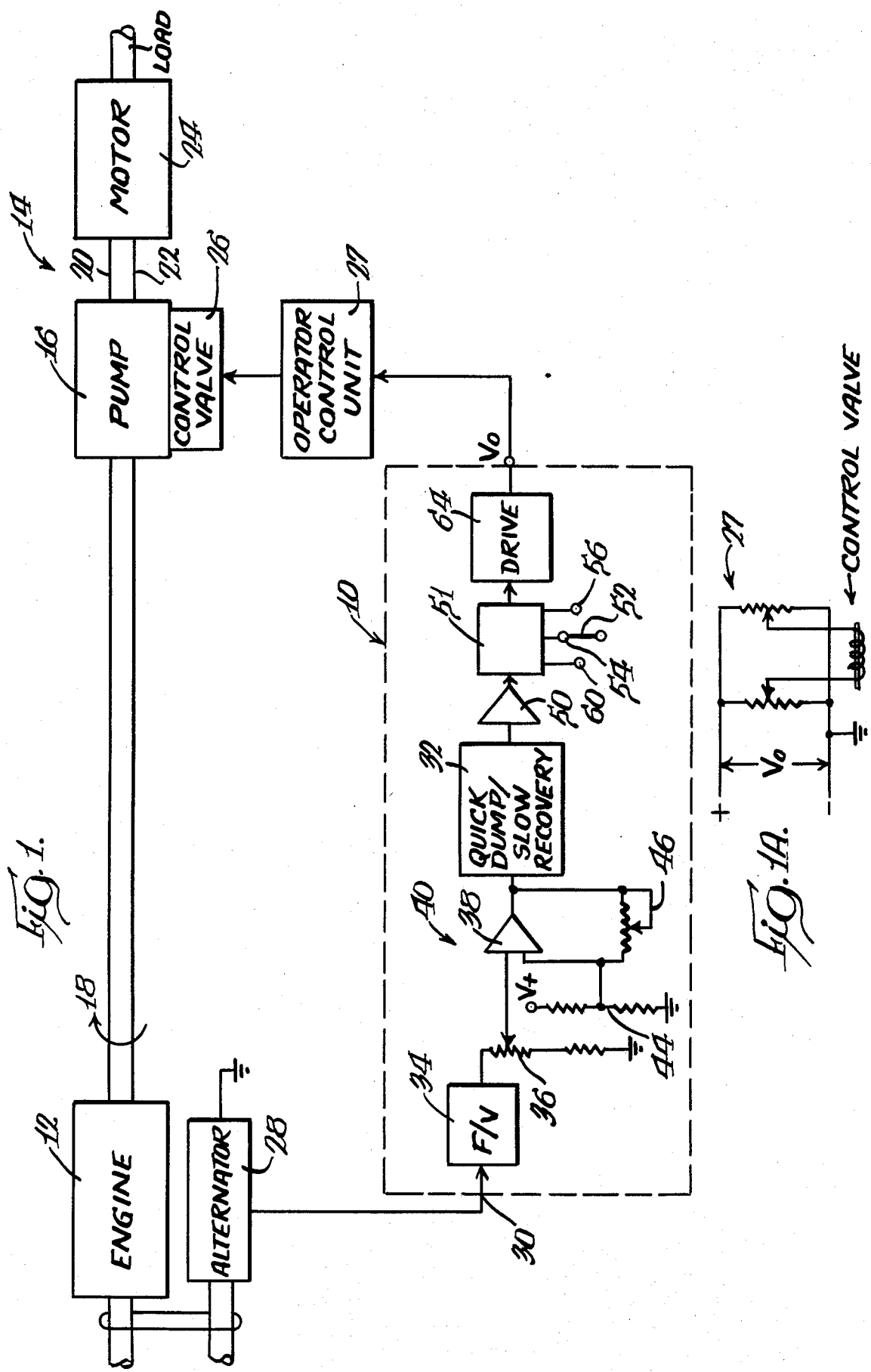

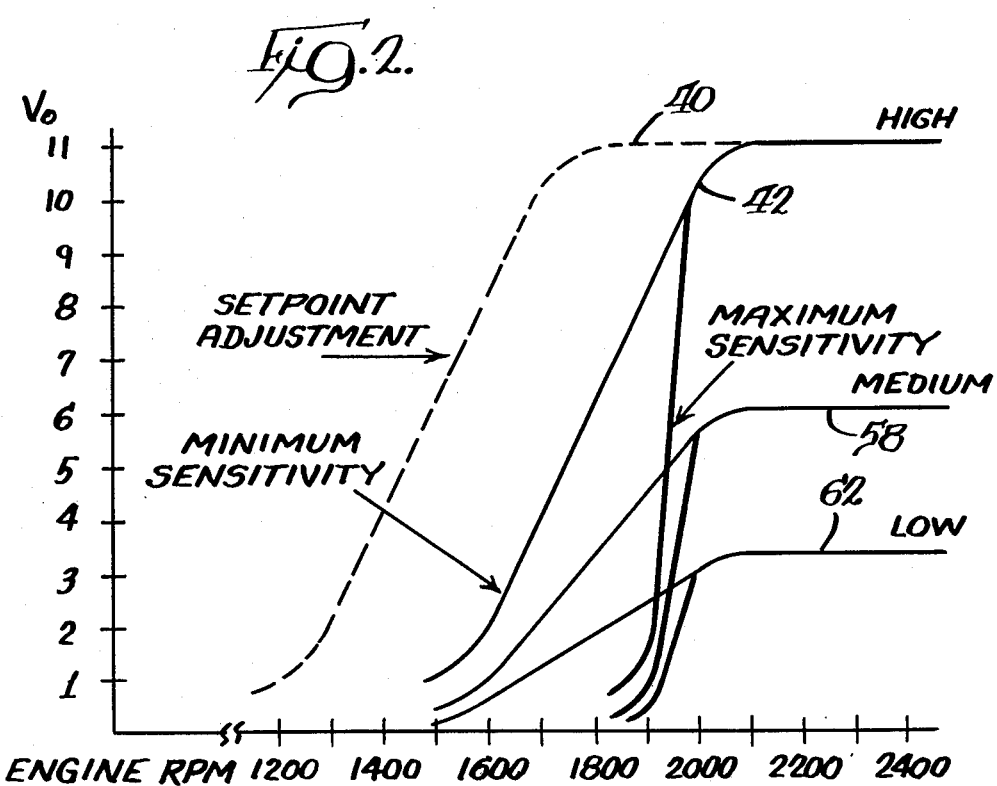
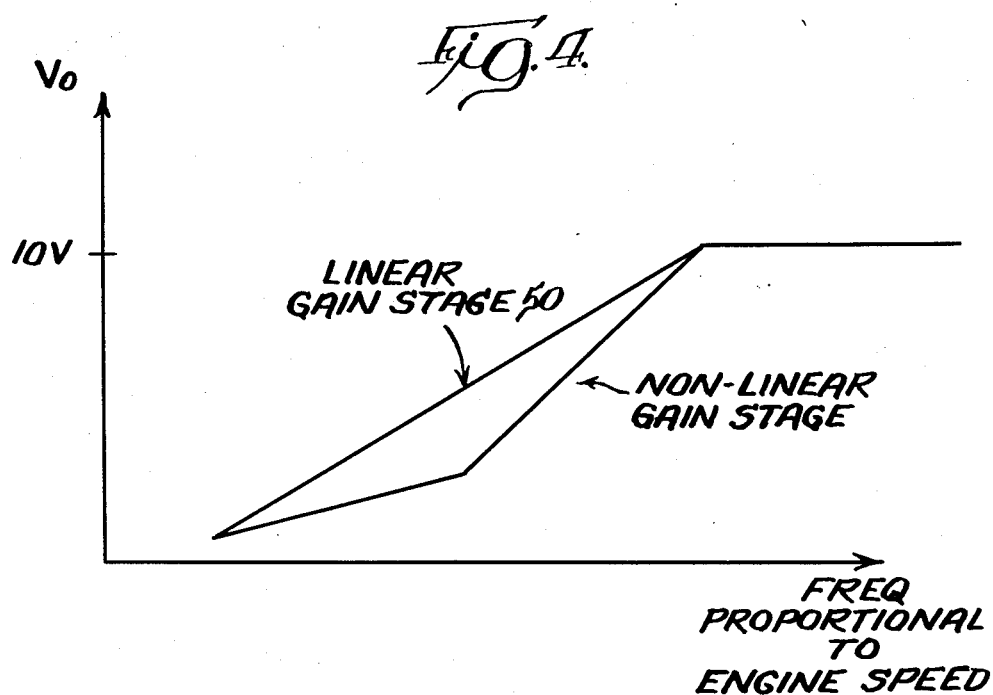

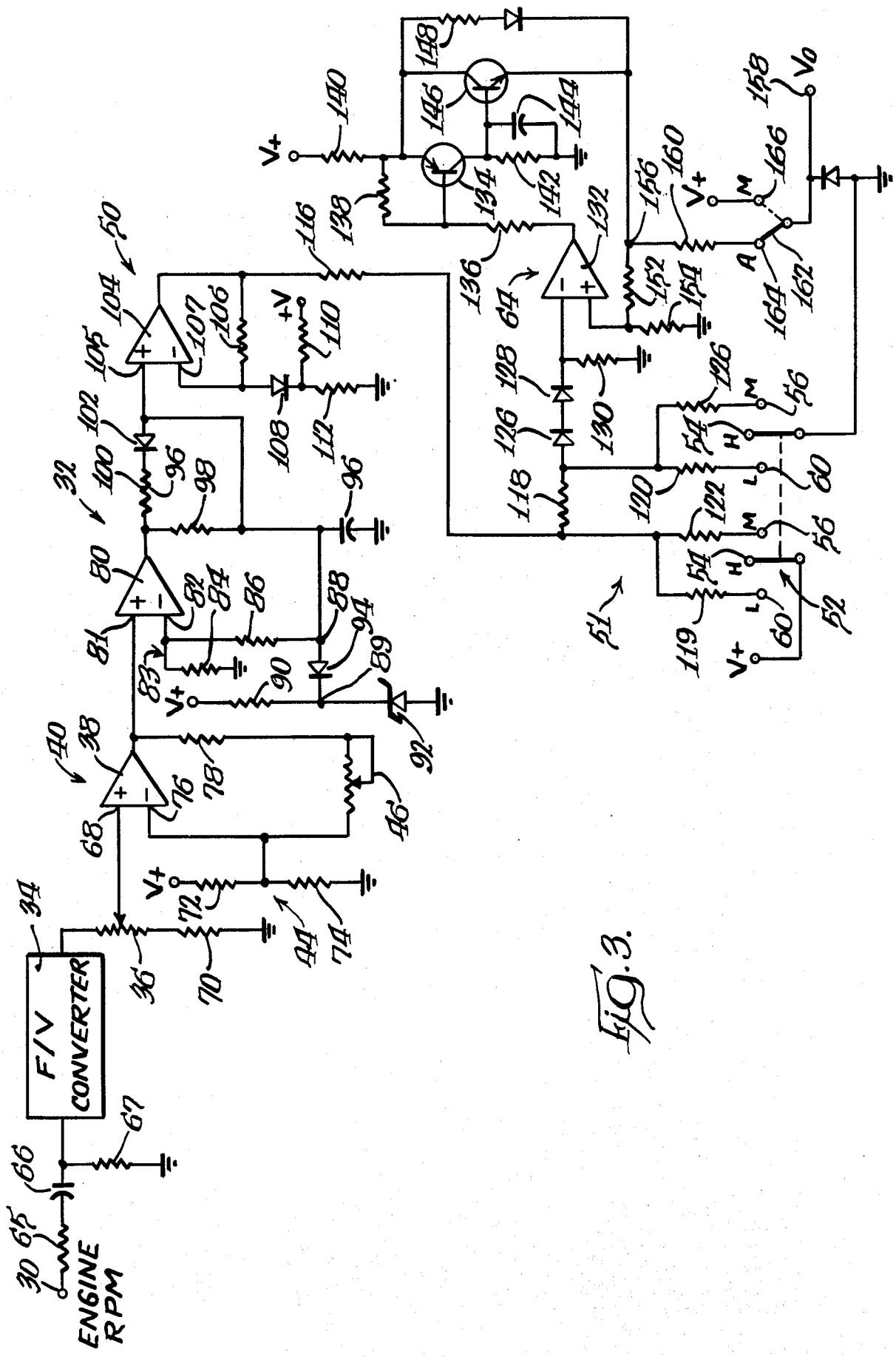

ANTI-STALL CONTROL

BACKGROUND OF THE INVENTION

The present invention relates to an anti-stall system which is utilized to reduce the displacement of a variable displacement hydraulic unit such as the pump of a hydrostatic transmission to reduce the drive ratio of the transmission, whereby overloading of a prime mover is prevented. More particularly, the invention relates to such a system having an electronic control and wherein, upon a decrease in the loading on the unit output, the control causes the displacement of the hydraulic unit to be increased at a slow rate to improve stability in operation of the prime mover.

Known anti-stall controls have been used to limit the power output from a hydrostatic transmission in which inputs from a prime mover, such as an engine, to a work stage are loaded by power outputs from the work stage. These anti-stall controls have generated an electrical signal which controls the hydrostatic transmission such that load torque on the engine is decreased in proportion to a decrease in the engine speed as sensed by the anti-stall control. Under dynamic conditions, rapid loading and unloading of the hydrostatic transmission by the known anti-stall controls may cause the engine to hunt, resulting in regenerative instability and decreased productivity.

Known anti-stall controls typically compare a signal representing the actual speed of the engine to a set point signal representing a desired engine speed to generate the electrical control signal. Heretofore the sensitivity of the control could not be adjusted without altering the set point, making it necessary to recalibrate the control whenever the sensitivity is altered.

An object of the invention is to provide a new and improved anti-stall electronic control system which controls the displacement of a variable displacement hydraulic pump to prevent overloading of a prime mover driving the pump and which provides a slow rate of change in pump displacement after the overload condition is removed to provide improved stability of the system.

Another object of the invention is to provide a new and improved electronic anti-stall control for a hydrostatic transmission which reduces the drive ratio of the transmission to prevent stalling of a prime mover upon an impending overload thereof and which increases the drive ratio at a slow controlled rate when the load drops to provide improved stability of the prime mover.

The anti-stall control includes means for sensing the speed of the engine to produce an actual speed voltage proportional thereto. The actual speed voltage is compared to a reference voltage for providing a D.C. signal having an amplitude proportional to the actual speed voltage. The D.C. signal is applied to a quick dump/slow recovery circuit, the output of which is a control voltage having an amplitude which decreases at a fast rate to a value proportional to the amplitude of the D.C. signal when the engine speed decreases and which increases at a slow rate to a value proportional to the amplitude of the D.C. signal when the engine speed increases.

The actual speed voltage is applied through a potentiometer to an op amp for comparison with respect to the reference voltage applied to another input of the op amp. The setting of the potentiometer establishes a set point which is the value of the reference voltage when the engine is operating at its optimum speed. A sensitivity potentiometer is provided in a feedback path connected between the output of the op amp and the reference voltage applied to the op amp so that the sensitivity of the anti-stall control may be varied without altering the set point. Thus, the control need not be recalibrated when the sensitivity is altered.

A nonlinear gain stage connected to the output of the quick dump/slow recovery circuit is provided so that the change in the control voltage when the engine is running at low speeds is more gradual than the change in the control voltage when the engine is running at high speeds.

A selectable attenuator is further provided so that the amplitude of the maximum control voltage generated by the anti-stall control may be varied depending on the work function being performed by the system.

Further advantages of the invention will be apparent from the following specification and the drawings in which:

FIG. 1 is a block diagram of a system having the anti-stall control of the present invention;

FIG. 1A is a schematic diagram of a double potentiometer included in the operator control unit shown in FIG. 1;

FIG. 2 is a graph of the control voltage, $V_0$, with respect to the engine speed;

FIG. 3 is a schematic diagram of the anti-stall control;

FIG. 4 is a graph of the control voltage, $V_0$, with respect to frequency.

The anti-stall control of the present invention is used to limit the power output from a system in which inputs from a prime mover to a work stage, such as the traction drive of a ditching machine, are loaded by power outputs from the work stage. The anti-stall control may be used in a system which controls work functions such as the ground speed of a trencher or a ditcher, the chain velocity of a wood chipper, or in other applications in which the prime mover must be kept near an optimum horsepower.

As shown in FIG. 1, an anti-stall control 10 is used in a system having an engine 12 which is the prime mover for a hydrostatic transmission 14 including a variable displacement pump 16 connected to the engine by a drive shaft 18. It is noted that although the anti-stall control 10 is shown for use with a hydrostatic transmission 14, the control may also be used with proportional valve/bleed valve/ hydraulic motor arrangements. The pump 16 is in communication with a motor 24 through conduits 20 and 22 to supply fluid under pressure to the motor 24 which drives the work stage creating a load. The amount of fluid supplied by the pump 16 to the motor 24 is controlled by a valve 26 which sets the displacement of the pump, the displacement of the valve being varied by an amount proportional to a voltage supplied by an operator control unit 27. The operator control unit 27 may have a single or a double potentiometer as shown in FIG. 1A, the input of which is a control voltage $V_0$ output from the anti-stall control 10.

In operation, where for example the hydrostatic transmission 14 drives the ground wheels or tracks of a trencher, as heavy trenching loads such as rocks or compacted earth are encountered, an increased load on the engine is created. The increased load is transmitted back to the system as a torque opposing the engine 12 resulting in a drop in engine speed from an optimum running speed.

The anti-stall control 10 is connected to one phase of an alternator 28, driven by the engine to provide an input at terminal 30 which has a frequency proportional to the speed of the engine 12. The input signal representing actual engine speed is monitored by the anti-stall control 10 which quickly responds to drops therein to decrease the control voltage $V_0$ by a proportional amount. The decreased voltage $V_0$, input to the operator control unit 27, proportionally decreases the setting of the control valve 26 to reduce pump displacement so that the hydrostatic transmission 14 imposes less load on the engine. The reduction of load torque on the engine 12 due to the reduced drive on the transmission, prevents the engine speed from decreasing further so that the engine speed is maintained within a narrow range. When the trenching load is subsequently decreased, reducing the load torque on the engine 12 so that the engine speed rises, the anti-stall control responds by increasing the control voltage, $V_0$, by a proportional amount.

Under dynamic conditions, rapid loading and unloading of the hydrostatic transmission 14 by the anti-stall control 10 can cause the engine 12 to hunt, resulting in regenerative instability. To prevent this problem, the anti-stall control 10 is provided with a quick dump/slow recovery circuit 32 which governs the rate of change of the control voltage $V_0$ so that the amplitude of $V_0$ decreases at a fast rate to unload the transmission, the amplitude of $V_0$ increasing at a much slower rate to reimpose load on the hydrostatic transmission. The quick dump/slow recovery circuit 32 prevents overloads so that the engine 12 does not stall while insuring stability of the system upon reloading. This results in increased productivity of the system.

In order to generate the control voltage $V_0$, the input signal from the alternator 28 to the anti-stall control 10 is applied to a frequency to voltage converter 34, the output of which is a voltage proportional to the actual running speed of the engine 12. The actual speed voltage output from the frequency to voltage converter 34 is applied through a set point adjustment potentiometer 36 to an operational amplifier 38 of a proportional gain stage, generally designated 40. The potentiometer 36 determines the engine speed at which the fixed maximum control voltage, $V_0$, will be generated, resulting in maximum displacement of the pump. The potentiometer 36 is adjusted so that the maximum control voltage $V_0$ is output from the anti-stall control 10 when the engine 12 is running at its optimum speed. As shown in FIG. 2, curve 40 is a plot of the control voltage $V_0$ for an engine having an optimum running speed of approximately 1800 rpm, whereas curve 42 is a plot of the control voltage $V_0$ for an engine having an optimum running speed of approximately 2200 rpm. When the engine speed is optimum, the voltage applied to the op amp 38 is equal to what is designated as a set point voltage.

The actual speed voltage applied to the op amp 38 is compared to a reference voltage applied to the op amp from a voltage divider 44, the reference voltage being fixed and made equal to the set point voltage when the actual speed voltage is also equal to the set point voltage. Under these conditions, the output of the proportional gain stage 40 is also equal to the set point voltage and the control voltage, $V_0$, generated has a constant maximum value. When the actual speed voltage drops below the reference voltage, the output of the op amp 38 drops by a proportional amount as determined by the setting of a sensitivity potentiometer 46 so that the control voltage, $V_0$, generated, drops to a decreased value. Because of the feedback path through the sensitivity potentiometer 46 connected to the output of the voltage divider, when the output of the op amp 38 decreases, the reference voltage applied to the op amp drops below the set point voltage to a value equal to the decreased actual speed voltage, thereby establishing a new reference voltage. If the engine speed subsequently increases so that the actual speed voltage rises above the new reference voltage, the output of the op amp 38 increases by a proportional amount, the control voltage, $V_0$, generated, rising to an increased value.

The sensitivity potentiometer 46 determines a proportioning band for the anti-stall control 10 wherein the proportioning band is the percent change in speed necessary to reduce the control voltage $V_0$ from the maximum control voltage to a minimum control voltage. As seen from FIG. 2, at maximum sensitivity the control voltage drops at a much steeper rate for a given decrease in engine speed than the control voltage at minimum sensitivity. Typically, the proportioning band is equal to 4% at maximum sensitivity and is equal to 20% at minimum sensitivity.

The output voltage of the proportional gain stage 40 is applied to the quick dump/slow recovery circuit 32 which, as described above, governs the rate of change of the control voltage $V_0$. When the engine speed drops, the circuit 32 causes the control voltage, $V_0$, to decrease from the maximum value to the decreased value at a fast rate. When the engine speed subsequently increases, the circuit 32 causes the control voltage, $V_0$, to increase from the decreased value to an increased value at a slow rate. The output of the quick dump/slow recovery circuit 32 is applied to a gain stage 50 which may be nonlinear as described below to provide for a more gradual change in the control voltage when the engine is running at low speeds than when the engine is running at high speeds.

A selectable attenuator 51 is provided to vary the amplitude of the fixed maximum control voltage, $V_0$, under various operating conditions. For the highest maximum control voltage $V_0$, a switch 52 is moved to an open circuit position contacting a terminal 54 so that no attenuation occurs as seen in FIG. 2 for curve 42. For the average maximum control voltage $V_0'$, the switch 52 is moved to contact a terminal 56 which provides some attenuation as shown for curve 58. For the lowest maximum control voltage $V_0'$, the switch 52 is moved to a position contacting terminal 60 which provides maximum attenuation as seen for curve 62. The output of the selectable attenuator 51 is applied to a power drive amplifier stage 64, the output of which is the control voltage $V_0$ applied to the operator control unit 27 to vary the setting of the control valve 26.

The anti-stall control 10 as shown in greater detail in FIG. 3 receives an input signal at terminal 30, the input signal having a frequency proportional to the actual speed of the engine. As discussed above, the terminal 30 may be connected to one phase of the alternator 28, the input signal being in the form of a square wave having a frequency proportional to the engine speed. The input signal may also be obtained from well-known pulse pickup devices which sense the rotation of a gear mounted on the drive shaft of the engine to provide a signal having a frequency proportional to the engine speed. The input signal is applied to the frequency to voltage converter 34 through a capacitive coupling including a series connected resistor 65 and a capacitor 66 which is connected to ground through a resistor 67. The output of the frequency to voltage converter 34 is a voltage proportional to the frequency of the input signal and thus proportional to the actual speed of the engine 12.

The actual speed voltage is applied to a non-inverting input terminal 68 of the op amp 38 through the 5 K Ω set point adjustment potentiometer 36 which is connected to ground through a 1.3 K Ω resistor 70. The setting of the potentiometer 36 is adjusted to provide a set point voltage of +2 volts to the input terminal 68 of the op amp 38 when the engine is running at its optimum speed. As discussed above and shown with reference to FIG. 2, the potentiometer 36 provides an adjustment range for the anti-stall control 10 so that the control may be used with various engines having different optimum running speeds without changing the set point voltage of the proportional gain stage 40.

The actual speed voltage applied to input terminal 68 of the op amp 38 is compared to the reference voltage applied to an inverting input terminal 76 from the voltage divider 44 which includes a 330 K Ω resistor 72 and a 62 K Ω resistor 74 connected in series between a +12 volt battery and ground. The voltage divider 44 provides a fixed reference voltage of +2 volts which is equal to the actual speed voltage applied to input terminal 68 when the engine is running at its optimum speed so that the output of the op amp 38 is also at +2 volts under these conditions. If the actual speed voltage applied to the input terminal 68 drops below the set point voltage of +2 volts, the output of the op amp 38 drops by a proportional amount as determined by the setting of the sensitivity potentiometer 46. The drop in the output voltage decreases the amplitude of the reference voltage to a value equal to the decreased engine speed voltage so that a new reference voltage, $V'_{ref}$, is applied to the inverting input terminal 76. If the actual speed voltage subsequently increases above the $V'_{ref}$, the output of the op amp 38 increases by a proportional amount.

The quick dump/slow recovery circuit 32 includes an op amp 80 having a noninverting input terminal 81 to which the output voltage of the op amp 38 is applied. The inverting input terminal 82 of the op amp 80 is connected to a voltage divider 83 comprised of a 360 K Ω resistor 84 and a 510 K Ω resistor 86 connected between ground and +6 volts provided at node 88 by a voltage clamp 89. The voltage clamp 89 is comprised of a 5.1 K Ω resistor 90 and a zener diode 92 connected between the +12 volt battery and ground, the voltage clamp being connected to node 88 through a diode 94 to maintain the voltage at node 88 equal to or less than +6 volts. The voltage across the capacitor 96 increases or decreases so as to match the voltage applied to the input terminal 81 of the op amp 80. The output of the op amp 80 is connected to a 50 µf capacitor 96 through a 470 K Ω resistor 98 connected in parallel with a series combination of a 10 K Ω resistor 100 and a diode 102. As will be seen, the RC time constant, determined by the values of the resistor 100 and the capacitor 96, determines the rate at which the control voltage $V_0$ decreases upon a decrease in the actual speed voltage, the RC time constant determined by the values of the resistor 98 and the capacitor 96 determining the rate at which the control voltage $V_0$ increases upon a subsequent increase in the actual speed voltage.

When the output of the op amp 38 drops, the output of the op amp 80 goes low, discharging the capacitor 96 through the diode 102 and the resistor 100 at a fast rate determined by the RC time constant of 10 K×50 µf. The voltage across the capacitor 96 as applied to the gain stage 50 thus decreases at a fast rate to a value proportional to the output voltage of the op amp 38. If the output of the op amp 38 subsequently increases, the output of the op amp 80 goes high, charging the capacitor 96 through the resistor 98 at a slower rate determined by the RC time constant of 470 K×50 µf, the voltage across the capacitor 96 applied to the gain stage 50, increasing at the slower rate to a value proportional to the increased output voltage of the op amp 38.

The voltage across the capacitor 96, applied to the gain stage 50, is a voltage which decreases exponentially at the fast rate when the engine speed drops and which increases exponentially at a slower rate when the engine speed increases. The gain stage 50 includes an op amp 104 having a noninverting input terminal 105 to which the voltage across the capacitor 96 is applied and having a negative feedback path through a 10 K resistor 106 connected to an inverting input terminal 107. A voltage divider, comprised of a 30 K Ω resistor 110 and a 6.2 K Ω resistor 112 is connected through a diode 108, between the inverting input terminal 107 and the resistor 106 to form a nonlinear gain stage. The gain stage 50 may be made linear having a gain of 2 by eliminating the diode 108 and the resistor 110 and changing the value of the resistor 112 from 6.2 K Ω to 10 K Ω. For the nonlinear gain stage shown, when the voltage across the capacitor 96 applied to the input terminal 105, is between 0 and approximately 2.5 volts, the gain of the gain stage 50 is unity. When the voltage across the capacitor reaches +2.5 volts, the diode 108 conducts, the resistors 110 and 112 attenuating the output of the op amp 104, fed back to the noninverting input terminal 107 so that the gain of the gain stage 50 is increased.

The difference between the output of the gain stage 50 when linear and nonlinear is illustrated in FIG. 4. For an anti-stall control 10 having the linear gain stage, the control voltage, $V_0$, generated, has a constant slope. For an anti-stall control having the nonlinear gain stage shown in FIG. 3, the control voltage, $V_0$, has a first slope for the lower speeds and a greater slope at the upper speeds so that when the engine is initially started and operating at low speeds, the load is more gradually increased than would be the case if the gain stage 50 were nonlinear.

The output of the gain stage 50 is connected to the selectable attenuator 51 through a 510 Ω resistor 116. For the highest maximum control voltage, the ganged switch 52 contacts the open circuit terminal 54 so that the output of the gain stage 50 is applied directly to the power drive amplifier stage 64 through a 510 Ω resistor 118. For the lowest maximum control voltage, the switch 52 is moved to contact terminals 60. In this position, the attenuator 51 is comprised of a 5.1 K Ω resistor 119, the 510 Ω resistor 118 and a 470 Ω resistor 120, connected between the +12 volt battery and ground. For the average maximum control voltage, with the switch 52 contacting terminals 56, the attenuator 51 is comprised of a 1.5 K Ω resistor 122 connected to the +12 volt battery and the 510 Ω resistor 118 connected to ground through a 1 K Ω resistor 124.

The output of the attenuator 51 is applied to the power drive amplifier stage 64 through series connected diodes 126 and 128, the cathode of diode 128 being connected to ground through a resistor 130 and to the inverting input terminal of an op amp 132. The output of the op amp 132 is connected to the base of a PNP transistor 134 through a resistor 136, a resistor 138 being connected between the base and the emitter of the transistor 134. The +12 volt battery is connected through a resistor 140 to the emitter of the transistor 134, the collector of which is connected to ground through a resistor 142 connected in parallel with a capacitor 144. The transistor 134 is connected to the base of an NPN transistor 146, the collector of which is connected to the +12 volt battery through the resistor 140. A resistor 148 connected in series with the diode 160 is connected across the collector and the emitter of the transistor 146. The emitter of the transistor 146 is connected in a feedback path through a voltage divider comprised of a resistor 152 and a resistor 154 connected to the noninverting input terminal of the op amp 132.

The output voltage of the power drive amplifier stage at a node 156 is connected to an output terminal 158 through a resistor 160 and a switch 162 which is connected to a terminal 164 in the automatic position shown to provide the control voltage $V_0$ across the double potentiometer in the operator control unit 27. In the manual mode the switch 162 is positioned to contact a terminal 166 to provide +12 volts to the operator control unit 27.

The operation of the anti-stall control 10 will now be described with reference to FIGS. 1A and 3. When the engine 12 is running at its optimum speed, the actual speed voltage applied to the input terminal 68 of the op amp 38 is equal to the reference voltage 76, both of which are equal to the set point voltage of +2 volts so that the output of the op amp is also +2 volts. The constant +2 volt output of the op amp 38 produces a constant maximum control voltage $V_0$ at the output of the anti-stall control, the maximum value of which is determined by the selectable attenuator 51. When the maximum control voltage is applied to the operator control unit 27, the unit sets the displacement of the pump to a maximum value, assuming the attenuator is in the high position.

If the hydrostatic transmission 14 or the work stage encounters a heavy load, the increased load is transmitted back to the system as a torque opposing the engine 12 resulting in a drop in the engine speed from the optimum running speed. The anti-stall control 10 senses the drop in the engine speed by the proportional drop in the actual speed voltage. When the actual speed voltage applied to input terminal 68 drops below the +2 volt reference voltage, the output of the op amp 38 decreases by an amount proportional to the decrease in the actual speed voltage. As the output of the op amp 38 decreases, a new reference voltage, $V_{ref}'$, is established at the input terminal 76 which is equal to the decreased actual speed voltage now applied to the input terminal 68. The drop in the output voltage of the op amp 38 causes the output of the op amp 80 to go low, discharging the capacitor 96 through the diode 102 and the resistor 100 so that the voltage applied across the capacitor 96 and applied to the gain stage 50, decreases at the fast rate. The resulting control voltage, $V_0$, drops at the fast rate from the maximum control voltage to a voltage the amplitude of which is proportional to the decreased output of the op amp 38. The decreased control voltage, when applied to the operator control unit 27, causes the control valve 26 to decrease its deflection by a proportional amount.

When the load torque on the engine 12 is subsequently reduced, the engine speed begins rise towards its optimum running speed. As the engine speed increases, the actual speed voltage applied to the input terminal 68 rises above the new reference voltage $V_{ref}'$ applied to the inverting input terminal 76 causing the output of the op amp 38 to increase a proportional amount. As the output voltage of the op amp 38 increases, the output voltage of the op amp 80 increases, charging the capacitor 96 through the resistor 98. The voltage across the capacitor 96 applied to the gain stage 50 and thus the control voltage $V_0$, increases at the slow rate to a voltage, the amplitude of which is proportional to the increased output of the op amp 38.

I claim:

1. In a system having an engine which drives a pump to supply fluid under pressure to a motor and including means responsive to a control voltage for altering the flow of fluid to the motor, an anti-stall control comprising:

means for sensing the speed of said engine, said means generating a voltage having an amplitude proportional to said speed;

means for comparing said speed voltage to a reference voltage, said comparing means generating a D.C. signal having an amplitude proportional to said speed voltage;

means for generating a control voltage in response to said D.C. signal, said control voltage having a maximum amplitude proportional to said D.C. signal when said speed voltage is equal to said reference voltage and having a decreased amplitude proportional to said D.C. signal when said speed voltage is less than said reference voltage;

means responsive to a decrease in the amplitude of said D.C. signal for decreasing the control voltage from said maximum amplitude to said decreased amplitude at a first rate; and means responsive to an increase in said D.C. signal for increasing the control voltage from said decreased amplitude to an increased amplitude at a second rate less than the first rate.

2. The anti-stall control of claim 1 further including:

means for generating a reference voltage having a fixed set point value when the speed voltage represents a desired engine speed; and means connected between the output of the comparing means and the reference voltage generating means for establishing the sensitivity of the anti-stall control, said sensitivity means being adjustable without altering the set point value of said reference voltage.

3. The anti-stall control of claim 2 further including an adjustable means connected between the sensing means and the comparing means for determining the engine speed at which the speed voltage generated equals the set point value.

4. The anti-stall control of claim 1 wherein the means responsive to a decrease and an increase in the amplitude of the D.C. signal includes a resistive-capacitive network connected to the output of the comparing means, said resistive-capacitive network having a first time constant for establishing the first rate at which said control voltage decreases and having a second time constant greater than the first time constant for establishing the second rate at which the control voltage increases.

5. The anti-stall control of claim 4 further including a nonlinear gain stage connected to the resistive-capacitive network for providing a gradual change in the amplitude of the control voltage when the engine is running at low speeds and for providing a steeper change in the amplitude of the control voltage when the engine is running at high speeds.

6. The anti-stall control of claim 1 further including means for establishing the maximum amplitude of said control voltage and selectable means for varying the maximum amplitude of the control voltage generated.

7. In a system having an engine which drives a pump to supply fluid under pressure to a motor and including means responsive to a control voltage for altering the flow of fluid to the motor, an anti-stall control comprising:

means for sensing the speed of said engine, said means generating an electrical signal having an amplitude proportional to said speed;

means for comparing said speed signal to a reference signal, said comparing generating a D.C. signal having an amplitude proportional to said speed signal;

rate means connected to the output of said comparing means for generating a rate signal having an amplitude proportional to said D.C. signal, said rate means being responsive to a decrease in the amplitude of said D.C. signal for decreasing the amplitude of said rate signal at a first rate and said rate means being responsive to a subsequent increase in the amplitude of said D.C. signal for increasing the amplitude of said rate signal at a second rate slower than said first rate; and means for generating a control voltage having an amplitude proportional to said rate signal, said control voltage decreasing at said first rate and increasing at said second rate.

8. The anti-stall control of claim 7 wherein the control voltage generating means includes means responsive to the amplitude of said rate signal for generating a control voltage, the amplitude of which varies by a first proportional amount for rate signals having a small amplitude and for generating a control voltage, the amplitude of which varies by a second proportional amount for rate signals having a larger amplitude.

9. The anti-stall control of claim 7 wherein the speed signal and the reference signal are voltages and further including:

means for generating a reference voltage having a fixed set point value equal to the speed voltage when the engine is running at a desired speed; and means for establishing a maximum amplitude for the control voltage generated when said speed voltage is equal to said set point value.

10. The anti-stall control of claim 9 further including means connected between the sensing means and the comparing means and being adjustable for determining the engine speed at which the speed voltage generated is equal to the set point value.

11. The anti-stall control of claim 9 further including means connected between the output of the comparing means and the reference voltage generating means for adjusting the sensitivity of the anti-stall control without altering the set point value.

* * * * *